United States Patent [19]

Yamamoto

[11] Patent Number: 5,134,712

[45] Date of Patent: Jul. 28, 1992

[54] SYSTEM FOR RECOVERING FAILURE OF ONLINE CONTROL PROGRAM WITH ANOTHER CURRENT ONLINE CONTROL PROGRAM ACTING FOR FAILED ONLINE CONTROL PROGRAM

[75] Inventor: Youichi Yamamoto, Kawasaki, Japan

[73] Assignee: Hitachi, Ltd., Tokyo, Japan

[21] Appl. No.: 274,323

[22] Filed: Nov. 21, 1988

[30] Foreign Application Priority Data

Dec. 4, 1987 [JP] Japan .................. 62-305634

[51] Int. Cl.⁵ .......................................... G06F 11/16
[52] U.S. Cl. ............................. 395/800; 395/650;
395/575; 364/DIG. 1; 364/265; 364/268.1;
364/265.6
[58] Field of Search ... 364/200 MS File, 900 MS File;
371/6, 7, 9.1, 8.1, 10.1, 11.1, 11.2, 11.3;
395/800, 650

[56] References Cited

U.S. PATENT DOCUMENTS

| | | | |
|---|---|---|---|
| 4,443,849 | 4/1984 | Ohwada | 364/200 |
| 4,648,031 | 3/1987 | Jenner | 364/200 |
| 4,710,926 | 12/1987 | Brown et al. | 364/9.1 |
| 4,815,028 | 3/1989 | Saitoh | 364/900 |
| 4,819,156 | 4/1989 | DeLorme et al. | 364/200 |
| 4,852,692 | 7/1989 | Makita | 364/200 |
| 4,868,744 | 9/1989 | Reinsch et al. | 364/200 |

Primary Examiner—Thomas C. Lee
Assistant Examiner—L. Donaghue
Attorney, Agent, or Firm—Fay, Sharpe, Beall, Fagan, Minnich & McKee

[57] ABSTRACT

In a processing system having a plurality of CPUs, a common storage device is shared by all the CPUs, online control programs are executed by the CPUs, and monitor programs monitor the states of the online control programs and control the online control programs. When a failure of an online control program occurs, the process of the failed online control program can be taken over by another online control program. A method of recovering from the failure of an online control program is characterized by quick restart information for each online control program which is stored separately in the common storage device and separate from a log.

7 Claims, 4 Drawing Sheets

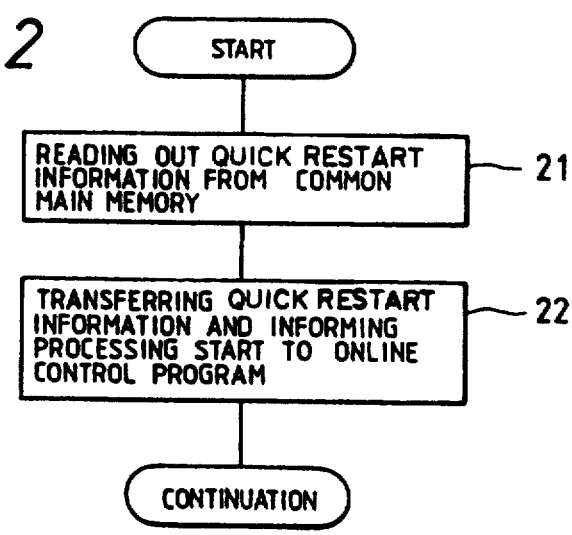
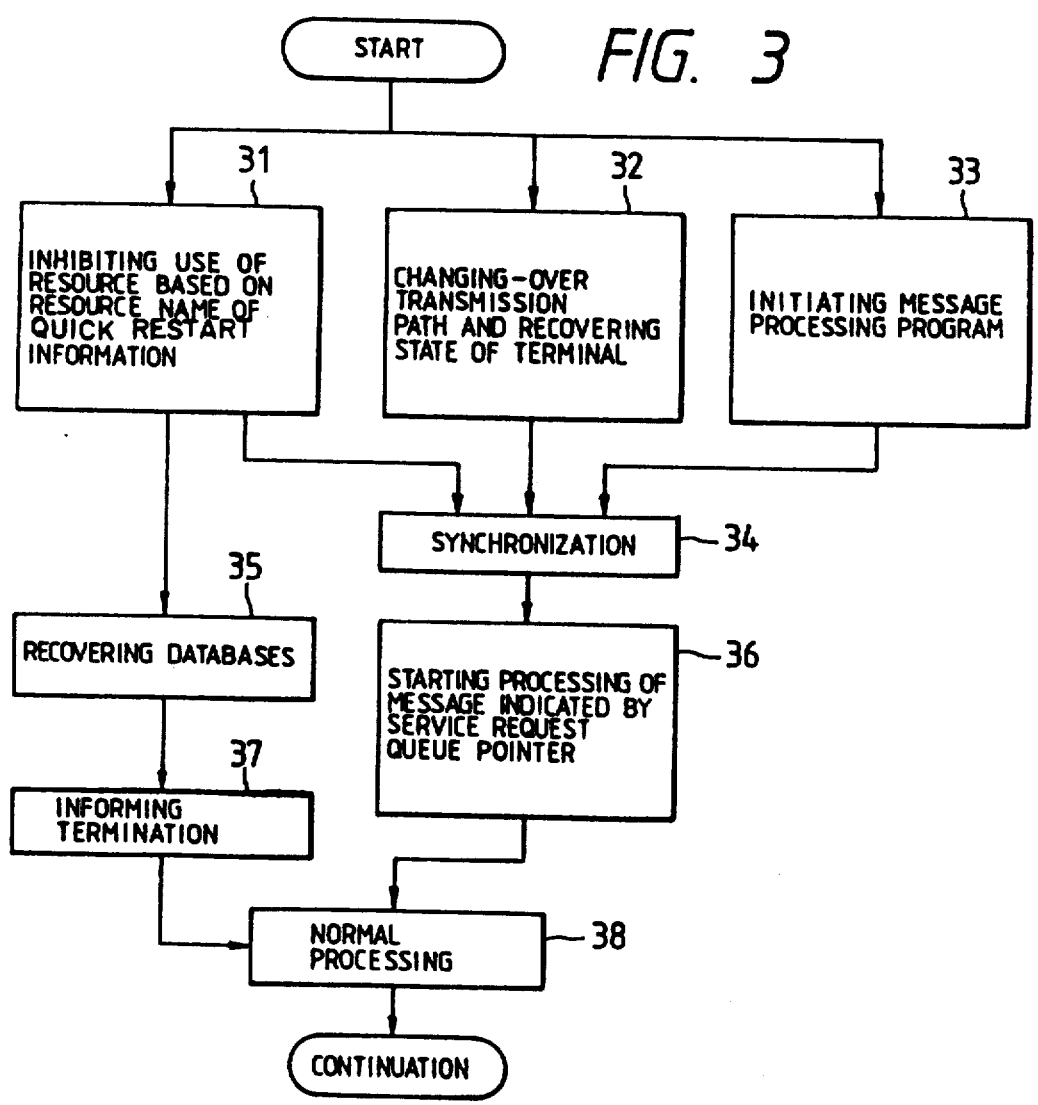

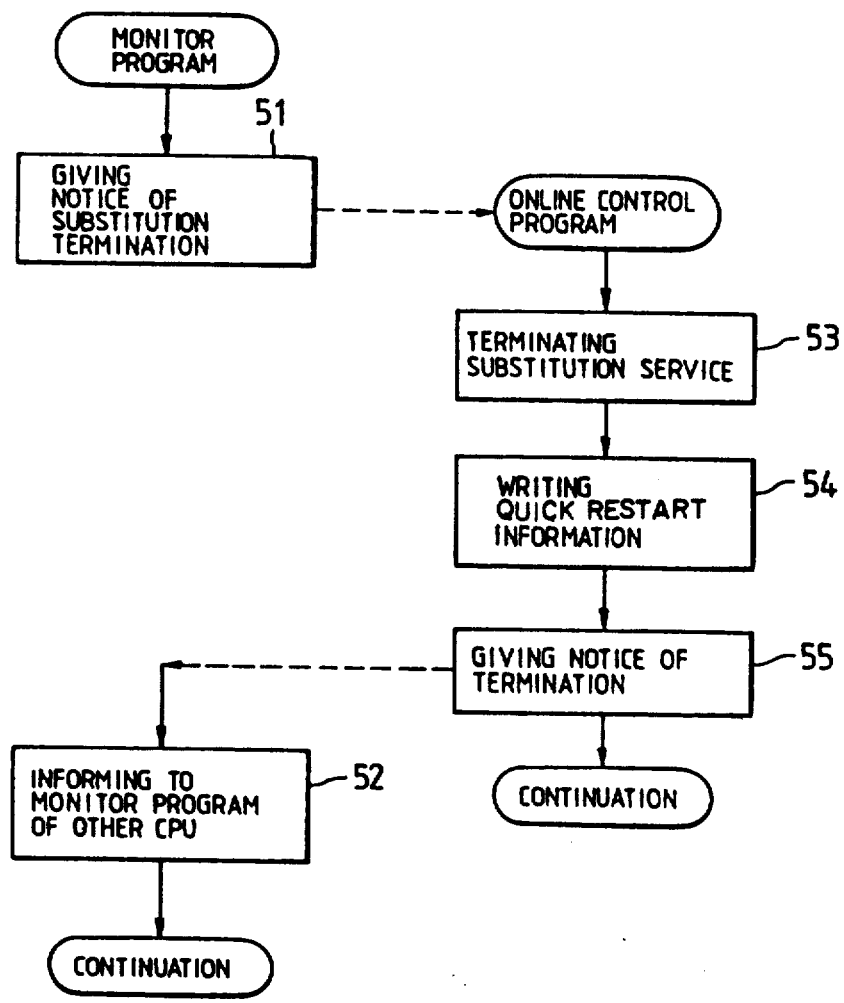

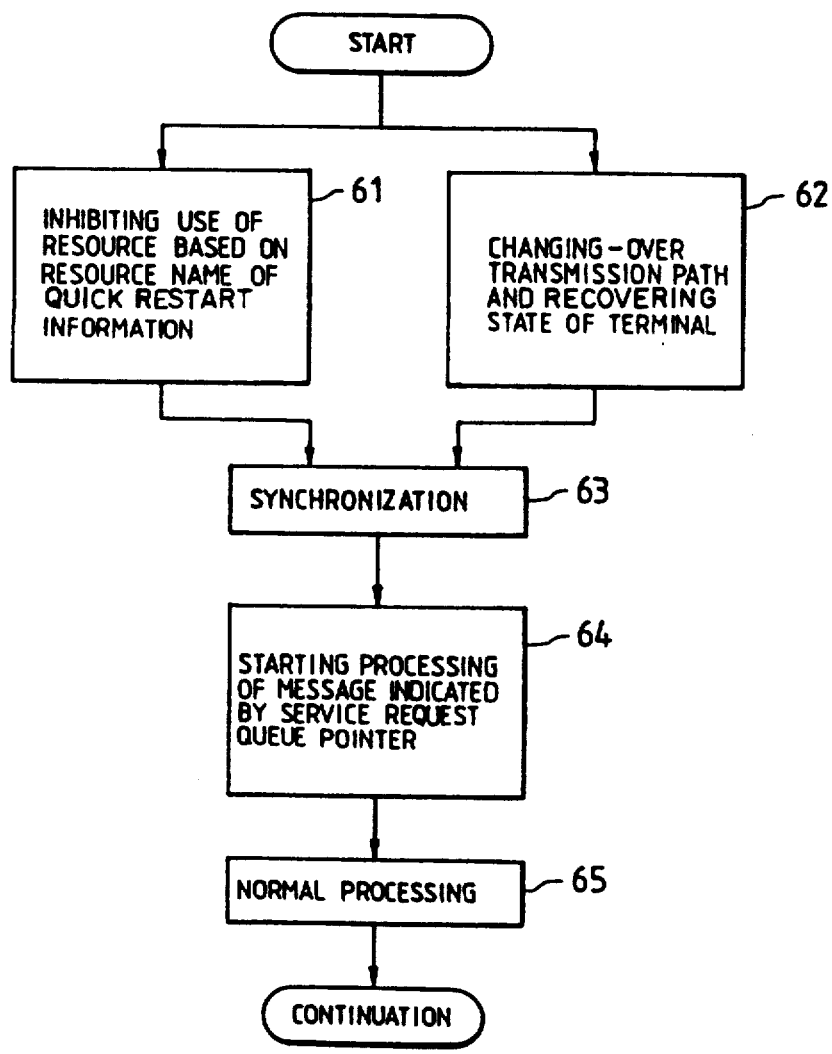

SYSTEM FOR RECOVERING FAILURE OF ONLINE CONTROL PROGRAM WITH ANOTHER CURRENT ONLINE CONTROL PROGRAM ACTING FOR FAILED ONLINE CONTROL PROGRAM

BACKGROUND OF THE INVENTION

1. Field of the Invention

The present invention relates, in a processing system having a plurality of CPUs each executing an online control program, to a method of recovering the failure of the online control program.

2. Description of the Prior Art

A prior-art method of recovering the failure of an online control program at high speed is called the "hot standby recovery method." With this method, in correspondence with the online control program, a standby program is previously prepared in a state in which the process of the preceding stage of a recovery process for the failure has been completed, and the recovery process is performed with the standby program at the failure of the online control program, thereby to shorten the recovery period of time.

The official gazette of Japanese Patent Application Laid-open No. 11457/1984, etc. are relevant to the technique of this type.

The hot standby recovery method in the prior art has had the following problems since the redundant construction in which the standby program is prepared separately from the online control program is employed, at the failure of the online control program, a service cannot be started until the recovery process with the standby program is completed. Further the online control program cannot be recovered at high speed in a case where it has failed after the failure of the standby program.

SUMMARY OF THE INVENTION

An object of the present invention is to recover from the failure of an online control program at high speed.

The present invention for accomplishing such an object is characterized in that a common storage device which is shared by a plurality of processors stores process quick restart information separately from log. When the online control program of a certain processor has failed, another processor inhibits the use of resources being processed by the failed online control program in view of the process quick restart information, fetches an unprocessed service and then starts it by the use of an available resource and executes a recovery process by the use of the log.

BRIEF DESCRIPTION OF THE DRAWINGS

FIG. 2 is a flow chart of the processing of a monitor program corresponding to an online control program which takes over a service at the failure of a certain online control program;

FIG. 3 is a flow chart of the failure processing of the online control program which takes over the service;

FIG. 4 is a flow chart of the restart processing of the monitor program;

FIG. 5 is a flow chart of the processing of another monitor program after the restart processing; and FIG. 6 is a flow chart of the processing of the online control program after being restarted.

DETAILED DESCRIPTION OF THE PREFERRED EMBODIMENTS

Figure 1:
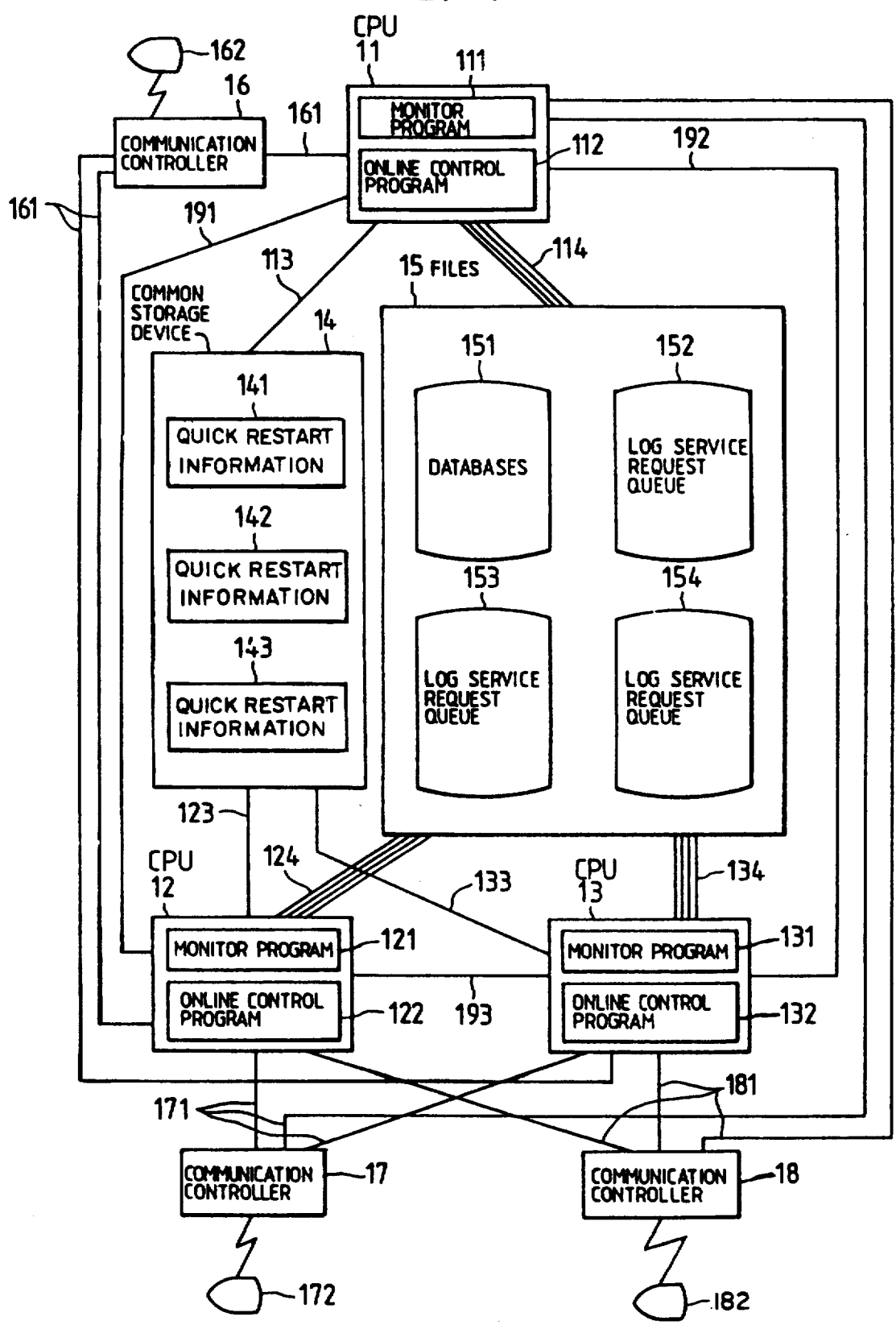
FIG. 1 is a diagram showing the system architecture of an embodiment of the present invention.

FIG. 1 is a diagram showing the system architecture of an embodiment of the present invention.

Referring to the figure, numerals 11, 12 and 13 designate CPUs, which are loosely coupled by communication paths 191, 192 and 193. In the respective CPUs, there are online control programs 112, 122 and 132 and monitor programs 111, 121 and 131. Numerals 162, 172 and 182 indicate terminals which receive the services of the online control programs. The terminals 162 receive the services of the online control program 112 through a communication controller 16. Likewise, the terminals 172 receive the services of the online control program 122 through a communication controller 17, and the terminals 182 receive the services of the online control program 132 through a communication controller 18. Shown at numeral 14 is a common storage device, which is shared by the respective CPUs and is connected with paths 113, 123 and 133. In the common storage device 14, there are items of quick restart information 141, 142 and 143 which correspond to the respective online control programs 112, 122 and 132. Numeral 151 indicates a file for databases which the online control programs use, and numerals 152, 153 and 154 indicate files having log items which correspond to the online control programs 112, 122 and 132, respectively. Service request queues are also stored in the files 152, 153 and 154. The file for the databases, 151, the files for the log items etc., 152, 153 and 154, and the communication controllers 16, 17 and 18 are physically connected to the respective CPUs by paths 114, 124, 134, 161, 171 and 181, and they are accessible from all the CPUs.

The quick restart information items 141, 142 and 143 include information items which indicate the names of resources (files) being processed and those which are available, and pointer information items of the service request queues.

Now, processing in the case where the online control program in the CPU has failed in the architecture of FIG. 1 will be described with reference to flow charts in FIGS. 2-6.

In the flow charts, FIG. 2 shows the processing of the monitor program corresponding to the online control program which takes over a service at the failure of another online control program. FIG. 3 shows the failure processing of the online control program which takes over the service. FIG. 4 shows the restart processing of the monitor program. FIG. 5 shows the processing of the other monitor program after the restart processing. FIG. 6 shows the processing of the online control program after being restarted.

When the online control program 112 in the CPU 11 has failed, the monitor program 111 senses the failure, and it communicates the failure to the respective monitor programs 121, 131 in the CPUs 12, 13 through the communication paths 191, 192. Which of the online control programs 122 and 132 takes over the service of the online control program 112 is predetermined according to priority levels, and the online control program 122 acts in conformity with the priority levels. Upon receiving the communication from the monitor program 111, the monitor program 121 reads out the quick restart information 141 of the online control program 112 from the common storage device 14 (Step 21 in FIG. 2), and it transfers the quick restart information to the online control program 122 and informs this program of a processing start (Step 22 in FIG. 2).

The online control program 122 which has started processing performs the following three steps in parallel: [1] On the basis of the name of resources being processed as included in the quick restart information, the use of the resources which need to be recovered is inhibited (Step 31 in FIG. 3). [2] The communication paths 161 are changed-over to recover the states of the terminals 162 so that the terminals 162 having received the service of the online control program 112 through the communication controller 16 may be permitted to receive the service of the online control program 122 (Step 32 in FIG. 3). [3] A program for processing a message for the service is initiated (Step 33 in FIG. 3).

Subsequent to the end of the processing [1], a process for recovering databases is executed (Step 35 in FIG. 3).

After all the processing steps [1], [2] and [3] have ended (Step 34 in FIG. 3), the service for the terminals 162 is restarted by reference to the service request queue based on the pointer in the quick restart information thereof (Step in FIG. 3), and the processing flow shifts to a normal process (Step 38 in FIG. 3). Meanwhile, services concerning the resource of which has been inhibited cannot be offered, but the other services can be rendered as usual. After the database recovering process has terminated (Step 35 in FIG. 3), the notice of the termination is given (Step 37 in FIG. 3), and the inhibition of the use of the resource is released. Thenceforth, the normal service is performed in a degenerate form.

There will be described processing in which the online control program having failed is restarted thereby to be restored into the normal state. The online control program 112 is restarted by the CPU 11. The monitor program 111 starts the online control program 112 (Step 41 in FIG. 4), and after start processing (Step 43 in FIG. 4), the online control program 112 waits a notice from the monitor program 111 without rendering any service (Step 44 in FIG. 4). After the start processing of the online control program 112 has terminated, the monitor program 111 informs the monitor programs 121 and 131 of the termination (Step 42 in FIG. 4).

When the monitor program 121, informed of the termination, gives the online control program 122 the notice of the termination of the start processing of the online control program 112 (Step 51 in FIG. 5), the online control program 122 stops the service which it has been substitutionally executing (Step 53 in FIG. 5), and it writes quick restart information into the common storage device 14 (Step 54 in FIG. 5) and gives the monitor program 121 the notice of the termination of the substitution service (Step 55 in FIG. 5). The monitor program 121 informs the monitor program 111 of the termination (Step 52 in FIG. 5).

When informed, the monitor program 111 returns to the processing in FIG. 2, in which it reads out the quick restart information 141 of the common main memory 14 (Step 21 in FIG. 2) and transfers the quick restart information to the online control program 112 waiting the notice of the processing start, thereby to inform this program 112 of the processing start (Step 22 in FIG. 2).

The online control program 112 informed of the processing start executes the two steps in parallel; [1] on the basis of the name of a resource being processed as included in the quick restart information, the use of the resource which needs to be recovered is inhibited (Step 61 in FIG. 6), and [2] the communication paths are changed-over to recover the states of the terminals 162 so that the terminals 162 having received the service of the online control program 122 through the communication controller 16 may be permitted to receive the service of the online control program 112 (Step 62 in FIG. 6). The initiation of a message processing program for the service has been done by the start processing. After both the processing steps [1] and [2] have ended (Step 63 in FIG. 6), the service for the terminals 162 is restarted by reference to the service request queue based on the pointer in the quick restart information (Step 64 in FIG. 6), and the processing flow shifts to a normal process (Step 65 in FIG. 6). Since this situation differs from the failure of the online control program, any recovering process need not be executed. In the above way, the system is restored to its original state.

The embodiments of the present invention described above are summed up as follows:

(1) The name of resources being processed and the head pointer of a service request queue are always put in a common main memory, every online control program and as information for quick restart processing at the occurrence of a failure.

(2) When an online control program has failed, another online control program inhibits the use of resources being processed by reference to the quick restart information in the common storage device and starts a recovering process by the use of log.

(3) In parallel with the recovering process, an unprocessed service is fetched from the service request queue on the basis of the service request queue pointer, and a service which employs usable resources is started. A service which employs the resource having had its use inhibited is set as an error.

(4) When the failure recovering process terminates, the resource the use of which has been inhibited is made usable.

(5) After the online control program having failed is restarted, the service which has been executed substitutionally by the other online control program is returned to the original online control program by processing similar to that of the failure recovery.

According to the foregoing embodiments, the information in the common storage device need not be recovered even at the failure of the online control program, so that the recovering process and the service quick restart can be independently performed by placing the service quick restart information in the memory, and that the period of time until service restarting is shortened by executing both the recovering and taking-over processes in parallel.

A standby program can be dispensed with by endowing the online control programs with the function of taking over the service request queues.

When the common storage device has failed, it is subjected to the prior-art recovering process, whereby it can be recovered in a time interval equal to that of the prior art even in the worst case.

I claim:

1. A method for recovering a failure of an online control program in a processing system comprising a plurality of processors, each of which has a local memory and processes an online control program and a corresponding monitor program stored in said local memory, a common memory device which is common to the processors and which is used by each online control program to store quick restart information independently, and a plurality of resources which includes disks, files on said disks, communication controllers and terminals, and which can be shared by the processors, the method comprising:
- a first step of inhibiting use of one of the plurality of resources being processed when the failure has occurred in a first online control program being processed by a first of the processors, by referring to quick restart information, arranged in said memory, by a second online control program of a second of the processors, wherein the quick restart information is accessed by a monitor program of the second processor;
- a second step of executing a recovering process, using a log in one of said disks, by the second online control program; and,
- a third step of fetching an unprocessed service according to the quick restart information in said common memory device and starting a service employing usable resources, in parallel with the processing of said second step and by said second online control program.

2. The method of recovering a failure of an online control program as defined in claim 1, wherein said taking-over information includes a name of the resource being processed and a pointer to a service request queue.

3. The method of recovering a failure of an online control program as defined in claim 1, further comprising steps of restarting the first online control program and returning service by said second online control program to the first online control program.

4. The method of recovering a failure of an online control program as defined in claim 4, further comprising steps of restarting the first online control program and returning service by said second online control program to the first online control program.

5. A processing system comprising:
- a first processor which processes and stores a first online control program;
- a second processor which processes and stores a second online control program;
- a plurality of resources which are necessary for the processing of the first online control program;
- a first memory which stores a log; and,
- a second memory which stores quick restart information for each online control program;
- said second processor including means for inhibiting use of a resource being processed by accessing quick restart information in said second memory when a failure of the first online control program being processed has occurred, and further including means for executing a recovering process by use of the log in said first memory and also starting an unprocessed service employing usable resources by accessing the quick restart information in said second memory.

6. A method for controlling a failure of an online control program in a system including a plurality of processors, each of said processors having means for processing and storing an online control program and a monitor program, a plurality of resources necessary for processing, a first memory for storing quick restart information for each online control program, and a second memory for storing log and database information, the method comprising steps of:
- monitoring a first online control program by a first monitor program, the first online control program being processed by a first of the plurality of processors and utilizing first resources to provide a service to a terminal;
- detecting a failure of the first online control program by the first monitor program;
- accessing the quick restart information by a second monitor program of a second of the plurality of processors in response to the detecting;
- transferring the quick restart information by the second monitor program to a second online control program processed by the second processor;
- inhibiting use of the first resources by the second online control program according to the quick restart information;
- recovering databases by the second online control program according to the log;
- processing by the second online control program utilizing second files to provide a portion of the service to the terminal, the portion only corresponding to the second resources wherein the second resources are different from the first resources;
- terminating the processing by the second online control program in response to a completion of the recovering;
- releasing the inhibiting of the first resources; and,
- restarting processing by the first online control program to provide the service to the terminal using both the first and second resources.

7. The method of claim 6 wherein the recovering and the processing occur in parallel fashion.

* * * * *